United States Patent [19]

Lavalier

[11] 4,108,453
[45] Aug. 22, 1978

[54] SNOWMOBILE FLOTATION SKI

[76] Inventor: Clair H. Lavalier, 308 2nd St., Parkville, Minn. 55773

[21] Appl. No.: 717,294

[22] Filed: Aug. 24, 1976

[51] Int. Cl.$^2$ ............................................. B62B 9/04
[52] U.S. Cl. ..................................... 280/28; 180/5 R
[58] Field of Search ...................... 280/28, 60 A, 610; 180/5 R; 9/310 A, 310 B, 310 C

[56] References Cited

U.S. PATENT DOCUMENTS

| | | | |
|---|---|---|---|
| 2,470,227 | 5/1949 | Wheeler | 280/610 |
| 3,416,810 | 12/1968 | Kennedy | 280/610 |
| 3,482,849 | 12/1969 | Puetz | 280/28 |
| 3,719,369 | 3/1973 | Savage | 180/5 R X |
| 3,720,421 | 3/1973 | Clemmer | 280/28 |
| 3,765,498 | 10/1973 | Rogerson | 180/5 R |

FOREIGN PATENT DOCUMENTS 583,102  8/1933  Fed. Rep. of Germany ........... 280/604

*Primary Examiner*—Evon C. Blunk
*Assistant Examiner*—Michael J. Forman
*Attorney, Agent, or Firm*—Townsend and Townsend

[57] ABSTRACT

A snowmobile ski including an elongate plywood body member and a flexible, air-impervious material covering the bottom surface of the body member. The body has a generally upwardly curved forward end and a width substantially greater than conventional snowmobile skis to provide support in soft snow, slush, ice, and the like. The flexible material covering the bottom surface of the body member is attached, and hermetically sealed, to the bottom surface along the outer margins and a longitudinal center line of the body member by a thin metal strap and a series of spaced bolts.

6 Claims, 5 Drawing Figures

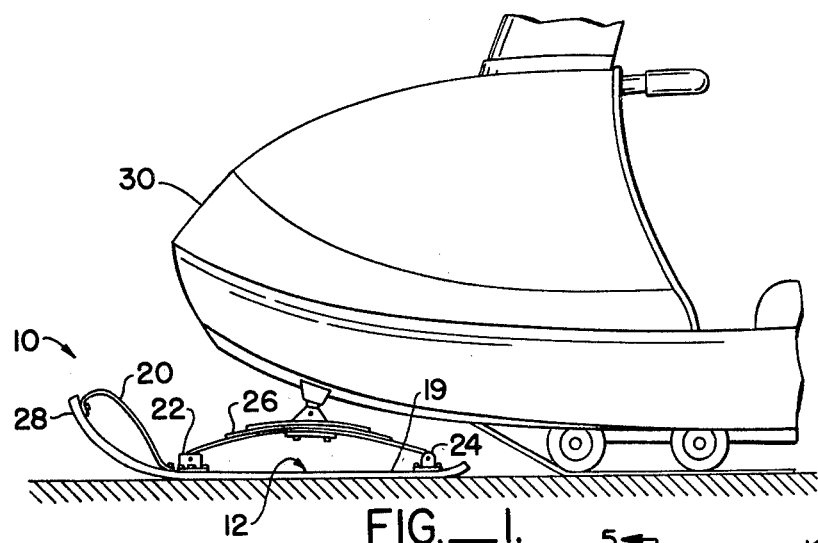
FIG._1.
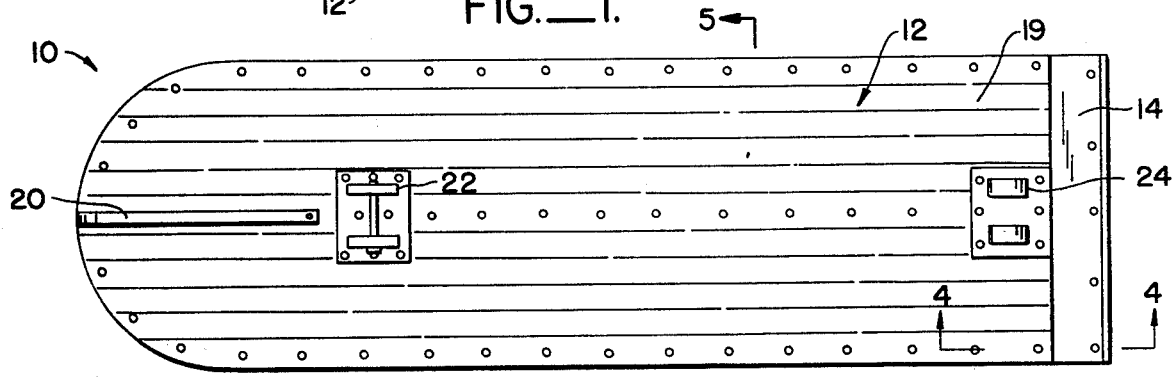
FIG._2.
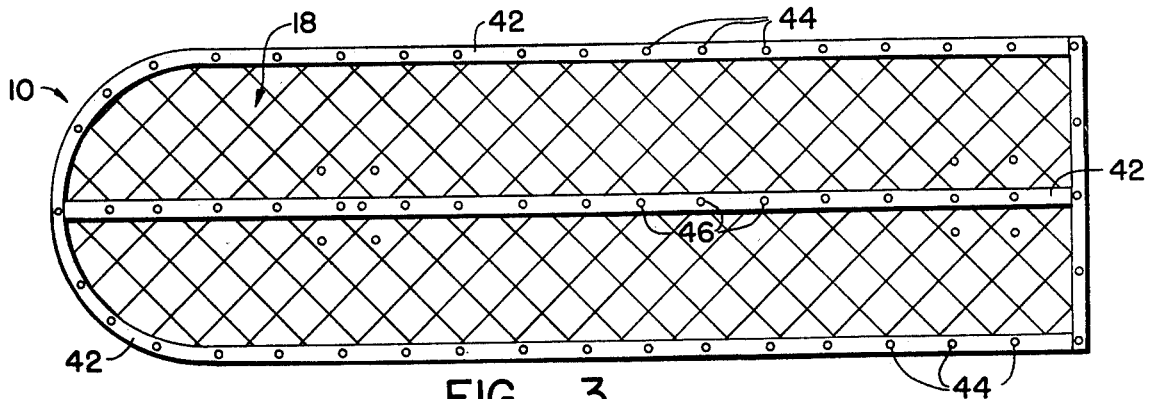
FIG._3.
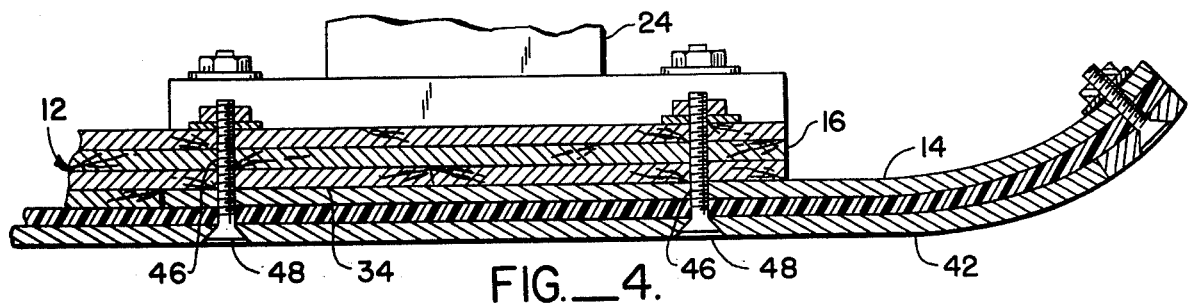
FIG._4.

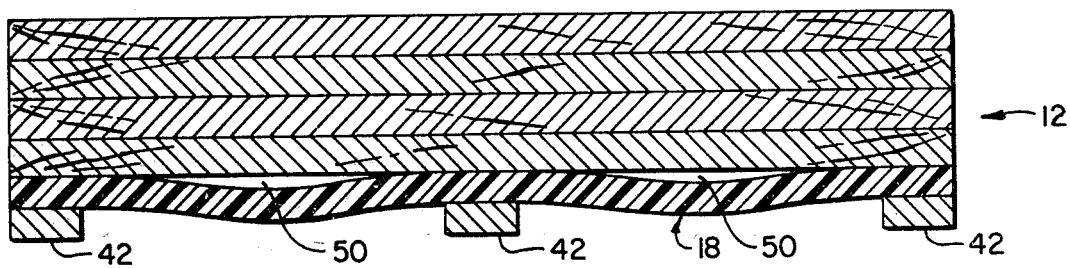
FIG._5.

SNOWMOBILE FLOTATION SKI

This invention relates to skis for snowmobiles and more specifically to skis for snowmobiles for use in deep snow, slush, or soft, icy conditions.

BACKGROUND OF THE INVENTION

Among the many winter sports in vogue today, one of the more popular is snowmobiling. The popularity of this sport has given rise to a rapidly expanding industry. Conventional snowmobiles usually comprise a pair of skis attached to the front of the vehicle and a drive belt proximate the rear portion of the vehicle for providing motive power. The skis conventionally used are approximately three to four inches in width and may be of a wood or sheet metal construction.

Unfortunately, the skis presently manufactured and used, for today's snowmobiling are not without certain problems. One problem encountered by the use of the narrow skis of present-day design is that they tend to sink and bog down in soft, deep snow areas or in slush and icy areas, such as rivers or lakes.

Another problem, particularly evident with wooden skis, is that they tend to "stick" or freeze in the snow when left standing for a period of time. The moisture content of wood skis will tend to freeze, causing the snow-contacting surface of the ski to freeze and stick to the snow when left standing for a period of time. In addition to a reduced capability to even traverse slushy or deep snow areas, snowmobiles equipped with the conventional narrow skis suffer a limitation on maneuverability, which can be hazardous. Additionally, the frozen moisture content of wood skis causes the grain of the wood to swell, ice formations to appear on the surfaces, and cracks to occur, which produces a roughened snow-contacting surface that increases the "drag" of the ski as it slides over the terrain.

Similarly, the low thermal insulation qualities of the snow-contacting surfaces of metal skis cause them to also show a marked tendency to stick or freeze in the snow. Thus, it can be seen that there is presently a need for a snowmobile ski that may be used in slushy or deep snow areas and does not suffer the problems pointed out above.

SUMMARY OF THE INVENTION

The invention comprises a snowmobile ski of substantial width to allow the snowmobile to properly maneuver and travel across areas of deep snow, soft powder, slush and the like. The ski is provided with a snow-contacting surface that reduces sticking or freezing to the snow and presents a relatively smooth snow-contacting surface.

The invention includes an elongate body member having a generally upwardy curved forward end, a length substantially equal to that of conventional snowmobile skis, and a width substantially wider than conventional skis. In the preferred embodiment, this width is approximately 12 inches. The lower surface of the rear portion of the body member is removed and adapted to receive a protective tailpiece which extends a short distance rearwardly beyond the rear end of the body member. Additionally, the tailpiece is attached so that the combined lower surfaces of the tailpiece and body member define substantially one continuous lower surface.

Covering the entire lower surface defined by the body member-tailpiece combination is a relatively thin, flexible sheet-like snow-contacting overlay material of low thermal conductivity and possessing air-impervious qualities. The overlay is attached to the lower surface of the body member-tailpiece combination only proximate the outer margin and along the longitudinal center line of the combination only by a thin, narrow, metal band. The band is placed on top of the overlay and adjacent the outer margin of the body member-tailpiece combination. A number of spaced bolts tightly attach the band to the body member to securely hold the overlay material therebetween and to hermetically seal the overlay to the body member.

The top surface of the body member is provided with a pair of spring mounting members to which a spring, or other mounting element, may be attached for connection to the snowmobile.

The present invention embodies a number of significant advantages not obtained by presently known snowmobile skis. First, the greater width provided by the present invention allows the ski to easily glide or "float" over deep and often powdery snow conditions, as well as over ice and slush often encountered near lakes and streams. The narrow skis presently used by snowmobilers have been found to be at an operating disadvantage under such conditions.

Moreover, the overlay is presently contemplated as being a resin-impregnated fiberglass cloth, in the preferred embodiment. This fiberglass snow-contacting surface provided the ski ensures a non-stick, smooth surface and, therefore, presents a minimum of resistance to sliding over snow and other surfaces. Additionally, by attaching and hermetically sealing the overlay material to the ski as described above, allows small pockets of air to become trapped between the overlay and the lower surface of the body member. These air pockets enhance the low thermal conductivity between the snow and the body member. Further, this method of attachment leaves the overlay free to flex somewhat. It has been found, surprisingly, that the ski tends to glide much more easily over all types of winter terrain surfaces including deep and powdery snow, ice and slush and it is believed that the method of attaching the overlay contributes to this result.

BRIEF DESCRIPTION OF THE DRAWINGS

FIG. 1 is a partial side elevation of a snowmobile illustrating attachment of the ski embodying the concept of the present invention to the snowmobile;

FIG. 2 is a top view of the ski of the present invention;

FIG. 3 is a bottom plan view of the ski of the present invention;

FIG. 4 is a section taken substantially along line 4—4 of FIG. 2; and

FIG. 5 is a cross-sectional view taken substantially along line 5—5 of FIG. 2.

DETAILED DESCRIPTION OF THE PREFERRED EMBODIMENTS

Turning now to the drawings, a flotation ski, generally designated by reference numeral 10, is shown to include body member 12, protective tailpiece 14 attached to and extending rearwardly beyond the rear end 16 of the body member. A relatively thin, flexible overlay material 18 covers the entire lower surfaces of the body member 12 and tailpiece 14.

Attached to the top surface 18 of the body member is a handle 20 and front and rear spring mounting members 22 and 24, respectively. Mounting members 22 and 24 allow connection to the spring 26 apparatus of the snowmobile 30 in any conventional manner.

The rear portion 16 of body member 12 is recessed or removed to form recess 34 which is adapted to receive tailpiece 14. The recess is of sufficient depth so that when the tailpiece is situated therein for attachment to the body member, the combined lower surfaces of the body member and tailpiece form the substantially continuous lower surface indicated in the figures.

The overlay material 18, which covers the lower surface of the body member-tailpiece combination, is fixedly attached thereto only at the outer margins, and along a longitudinal center line, of the lower surface. A number of spaced apertures 44 are provided body member 12 and tailpiece 14, perpendicular to the lower surfaces of the two and extending to their upper surfaces. The apertures are situated proximate the outer margin, as well as along a longitudinal center line, of the lower surface defined by the body member-tailpiece combination. A thin, narrow strap or band 42 tightly sandwiches the entire outer edge, and the longitudinal center portion, of the overlay material 18 between the strap and the body member-tailpiece combination to hold the material in overlapping relation thereto. The band 42 is secured to the body member and tailpiece by a number of bolts 44 which extend through apertures 46. The head 48 of each bolt 44 is countersunk in the band 42.

Body member 12 is preferably fabricated from $\frac{3}{8}$ inch plywood material. Plywood provides a ski body that is light in weight and inexpensive and easy to construct. The front portion 28 of body member 12 is formed in a generally upwardly curved bend by any of the construction methods presently known by those skilled in this art.

Typically, the horizontal length of the ski 10 is approximately 45 inches. The tailpiece 14 is approximately 10 inches in length and extends beyond the body member 12 approximately 4 inches. The width of ski 10 is substantially wider than conventional skis presently used in snowmobiling. Preferably ski 10 has a width of approximately 12 inches. This extra width acts to keep the ski above the slush and ice on lakes and rivers.

The tailpiece 14 is of steel construction. The purpose of the tailpiece is to protect the rear portion of body member 12 from damage that can be caused by chunks or large particles of rock and ice contained in slush areas near lakes and streams.

The overlay material 18 is presently fabricated from a fiberglass cloth material — approximately 10 ounces in weight — and impregnated with resin. It has been found that the use of resin-impregnated fiberglass as the overlay material 18 provides a smooth, strong, snow-contacting surface for the ski 10 that is low in thermoconductivity to minimize sticking and freezing of the ski to the snow. Further, it is believed that this method of attachment enhances the low thermoconductivity between the inclement surface upon which the ski 10 sits by allowing small pockets of air 50 (FIG. 5, wherein air pockets 50 are illustrated in exaggerated form) to form among the interwoven glass fibers and between the lower bottom surface of the body member-tailpiece combination and overlay, to provide additional thermal insulation.

Additionally, it has also been found that by not bonding or otherwise causing the overlay to adhere to the entire lower surface of the body member 12, so that the material is allowed to flex somewhat, decreases the frictional adherence of the ski to the surface over which it travels is decreased. Thus, the ski has been found to travel over such areas as soft snow, slush, and ice much easier when the material is attached as described above.

While the above provides a full and complete disclosure of the preferred embodiment of the invention, various modifications, alternate constructions and equivalents may be employed without departing from the true spirit and scope of the invention. For example, the body member may be constructed from fiberboard, or other material than plywood, if desired.

Therefore, the above description and illustrations should not be construed as limiting the scope of the invention, which is defined by the appended claims.

I claim:

1. A snowmobile ski for use in soft, deep snow, ice, or slush conditions, comprising:
    an elongate body member having an upper surface, a lower surface, a generally upwardly curved forward end, and a width at least about 8 inches;
    a sheet-like overlay covering the lower surface of the body member and attached to an outer periphery of the lower surface of the body member, forming at least one air pocket in the interstice between the overlay and the lower surface, the overlay being fabricated from a smooth, thin, flexible, air-impervious material;
    means for attaching and substantially hermetically sealing the overlay to the outer periphery of the lower surface of the body member, the attachment means holding the overlay snug against said lower surface; and
    means attached to the upper surface of the body member for releasable attachment of the ski to a snowmobile.

2. The ski of claim 1, wherein the body member is plywood.

3. The snowmobile ski of claim 2 including a tailpiece element attached to the rear end of the body member and having a bottom surface that lies substantially in the plane of the lower surface of the body member to thereby continue and extend the lower surface of the body member rearwardly, the tailpiece member including a generally upwardly curved rearward end and a width that conforms to the width of the body member.

4. The snowmobile ski of claim 1, wherein the overlay attachment means includes a first, thin metal band attached to the lower surface of the body member adjacent the outer periphery thereof with the overlay captured and held between said lower suface and said first band.

5. The snowmobile ski of claim 4, wherein the overlay attachment means includes a second thin, metal band attached to the lower surface of the body member, capturing portions of the overlay therebetween, the metal band being positioned generally central and extending in a longitudinal direction of the lower surface of the body member.

6. The snowmobile ski of claim 1, wherein the overlay is a resin-impregnated fiberglass material.

* * * * *